United States Patent
Lin et al.

(10) Patent No.: US 10,185,864 B1
(45) Date of Patent: Jan. 22, 2019

(54) FINGERPRINT SENSING DEVICE AND METHOD OPERATING THE SAME

(71) Applicant: SunASIC Technologies Limited, Wanchai (HK)

(72) Inventors: Chi Chou Lin, New Taipei (TW); Zheng Ping He, Taipei (TW)

(73) Assignee: SunASIC Technologies Limited, New Taipei (TW)

( * ) Notice: Subject to any disclaimer, the term of this patent is extended or adjusted under 35 U.S.C. 154(b) by 75 days.

(21) Appl. No.: 15/641,395

(22) Filed: Jul. 5, 2017

(51) Int. Cl.
    *G06K 9/00* (2006.01)
    *G06F 3/041* (2006.01)
    *G06F 3/044* (2006.01)

(52) U.S. Cl.
    CPC ............ *G06K 9/0002* (2013.01); *G06F 3/044* (2013.01); *G06F 3/0416* (2013.01); *G06K 9/00087* (2013.01)

(58) Field of Classification Search
CPC ..... G06F 3/044; G06F 3/0416; G06K 9/0002; G06K 9/00087
See application file for complete search history.

(56) References Cited

U.S. PATENT DOCUMENTS

| | | | | |
|---|---|---|---|---|
| 5,374,787 A | * | 12/1994 | Miller .................. | G06F 1/1626 178/18.06 |
| 5,495,077 A | * | 2/1996 | Miller .................. | G06F 1/1626 178/18.06 |
| 5,543,588 A | * | 8/1996 | Bisset .................. | G06F 1/1626 178/18.06 |
| 6,239,389 B1 | * | 5/2001 | Allen .................... | G06F 1/1626 178/18.01 |
| 8,803,838 B2 | * | 8/2014 | Haga .................... | G06F 3/0412 178/18.01 |
| 10,049,253 B2 | * | 8/2018 | Yang .................... | G06K 9/0002 |
| 2015/0091859 A1 | * | 4/2015 | Rosenberg ............. | G06F 3/044 345/174 |
| 2015/0346253 A1 | * | 12/2015 | Wang ................ | G06K 9/00073 324/662 |
| 2018/0211083 A1 | * | 7/2018 | Du ....................... | G06K 9/0002 |
| 2018/0224972 A1 | * | 8/2018 | Yang ..................... | G06F 3/044 |

* cited by examiner

*Primary Examiner* — Manav Seth
(74) *Attorney, Agent, or Firm* — Jackson IPG PLLC; Demian K. Jackson

(57) ABSTRACT

A fingerprint sensing device and a method operating the fingerprint sensing device are provided. The fingerprint sensing device includes at least one sensing core, a system unit, at least one switching unit and a charge holding unit. The switching unit is connected between the sensing core and the system unit to provide four different operation states: a normal state; an isolation state; a drive-up state; and a drive-down state. A voltage shift between the finger and the sensing core is generated by controlling the switching unit to perform different operation states in various orders.

24 Claims, 11 Drawing Sheets

| State<br>Switch | Normal State | Isolation State | Drive-up State | Drive-down State |
|---|---|---|---|---|
| Power Switch | On | Off | Off | Off |
| Drive-up Switch | Off | Off | On | Off |
| Drive-down Switch | Off | Off | Off | On |
| Ground Switch | On | Off | Off | Off |

Fig. 4

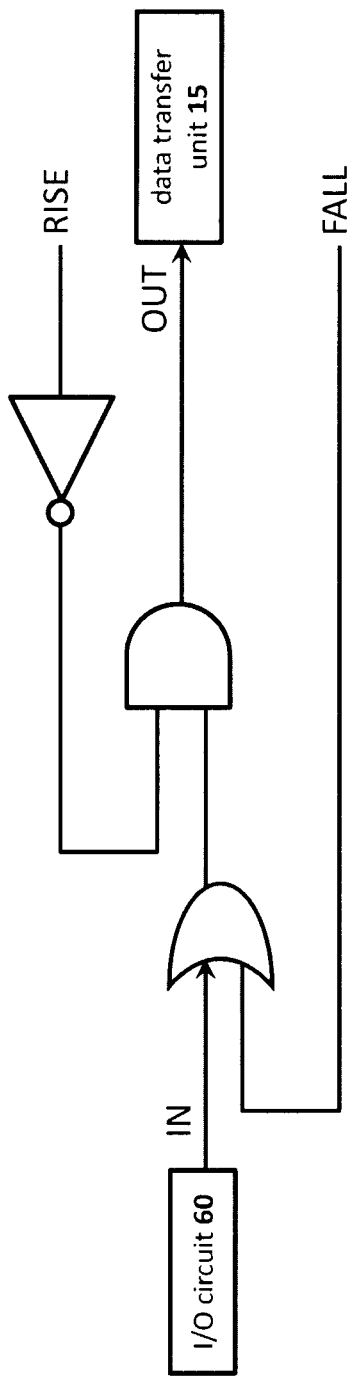
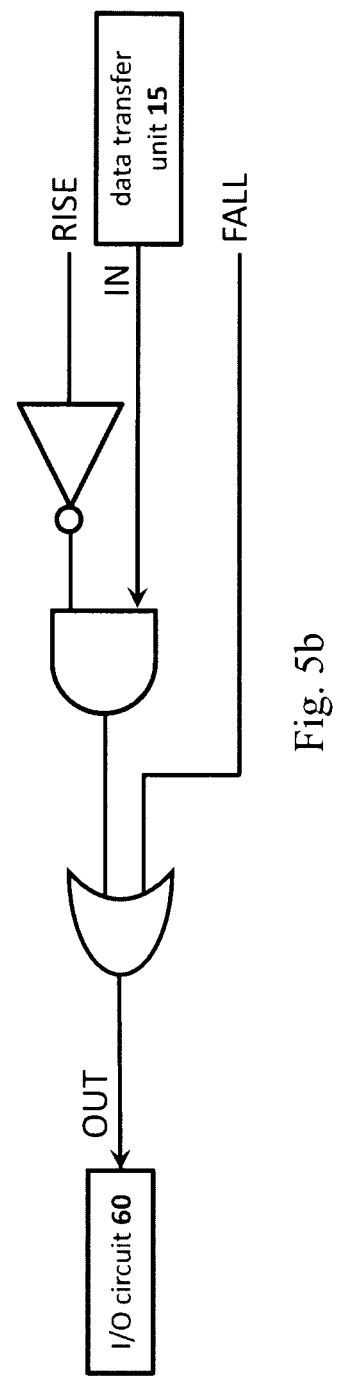
Fig. 5a
Fig. 5b

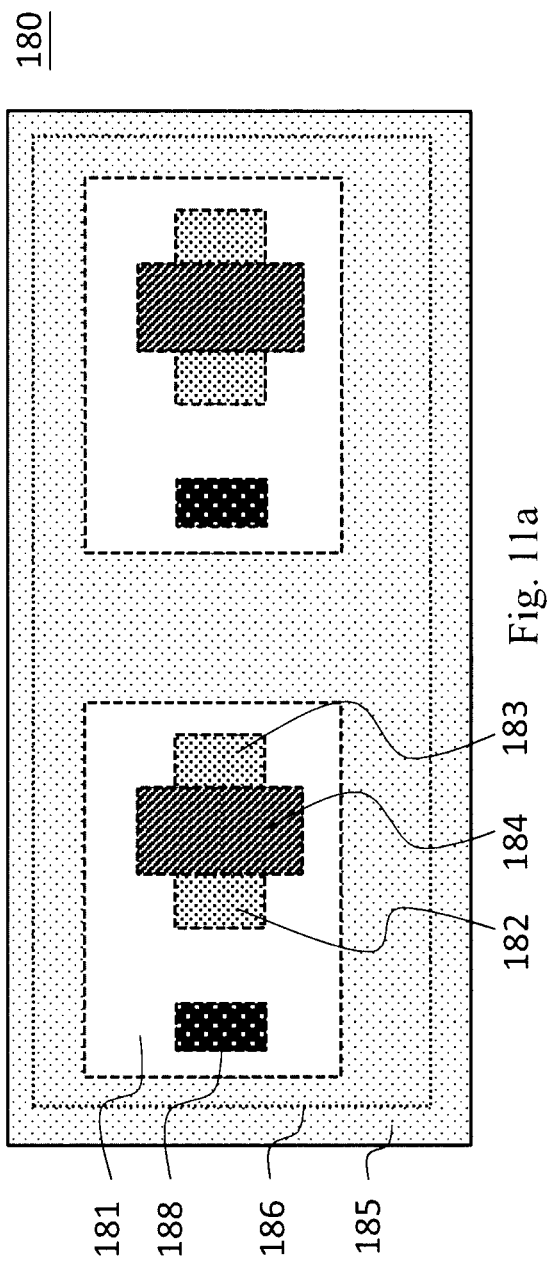
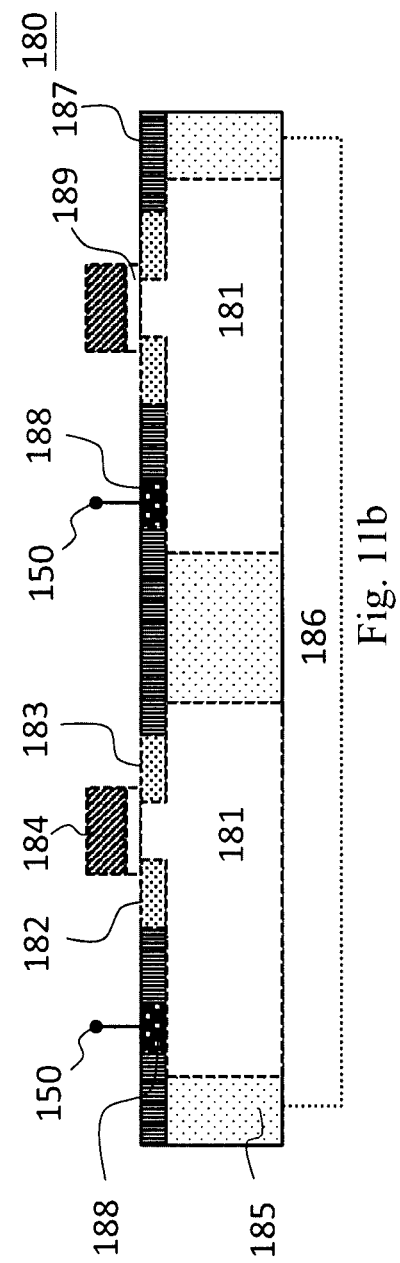
Fig. 11a
Fig. 11b

FINGERPRINT SENSING DEVICE AND METHOD OPERATING THE SAME

FIELD OF THE INVENTION

The present invention relates to a fingerprint sensing device and a method operating the fingerprint sensing device. More particularly, the present invention relates to a fingerprint sensing device with a switching unit that can generate voltage shift between a finger and the fingerprint sensing device by switching between different operation states in various orders.

BACKGROUND OF THE INVENTION

There are many human physiological characteristics which can be used to provide personnel identification for security purposes, such as fingerprint, retina, iris, DNA, or even facial features. Among the devices that are capable of distinguishing physiological characteristics of one person from another, fingerprint sensing technology has become widespread in use and is often used to provide secure access to sensitive electronic devices and/or data. Generally, capacitive fingerprint sensors may be used to determine an image of a fingerprint through measuring capacitance through each capacitive sensing element of a capacitive sensor. The higher the capacitance, the nearer the surface of an adjacent or overlying finger to the capacitive sensing element. Thus, fingerprint ridges provide a higher capacitance in an underlying capacitive sensing element than do fingerprint valleys.

Capacitive fingerprint sensors come in at least two varieties, namely active and passive. Active capacitive sensors are often used in electronic devices to provide biometric security and identification of users. Active capacitive sensors initially excite the epidermis of the sensed finger. Capacitance to the epidermis is measured at each capacitive sensing element. Specifically speaking, the capacitance may be measured or determined by measuring a capacitive sensing element's voltage and/or charge during a low voltage phase and a high voltage phase of a modulation frequency for the capacitive sensing element array. The difference in voltages may be used to determine capacitance.

Some prior arts teach to obtain the low voltage phase and the high voltage phase by use of a drive ring formed around the sensor which excites the sensed finger and the voltage and/or the charge at each capacitive sensing element may vary as the drive ring is modulated since the voltage potential of the finger changes with the modulation of drive ring.

However, the voltage applied to the drive ring may be limited. Commonly, the drive ring voltage is no more than 4 volts peak-to-peak. Voltages above this may be too high for exciting the finger; this excessive excitation may be detected by a person as a "tingling" or uncomfortable feeling in their finger. Although the exact voltage at which one can sense the tingling varies from person to person, a 4 volt peak-to-peak voltage is generally considered as the threshold beyond which the feeling is noticeable.

Since the drive ring's voltage is restricted to avoid user perception, the thickness of any dielectric overlaying the sensor may also be limited. The thicker the dielectric between sensor pad and finger, the more attenuated the resulting capacitance and the blurrier the fingerprint image becomes. For dielectrics having a thickness or more than approximately 100 microns, the fingerprint image may become unreliable.

Another limitation arises when other parts of the user's finger or hand or body may capacitively couple through earth ground to the system, or directly to the system ground when touching other parts of the system. This capacitive coupling from the user to the system may be highly variable depending on how the user is touching the device. This parasitic coupling attenuates the voltage that the drive ring is able to drive into the user's finger, and as such reduces the signal. The attenuation may be highly variable depending on how the user is touching the device.

Due to the aforementioned disadvantages of prior arts, a fingerprint sensing device that can acquire high-quality fingerprint images without depending on how the user is touching the device is desperately desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to overcome the aforementioned problems of prior arts, a fingerprint sensing device that can acquire high-quality fingerprint images without depending on how the user is touching the device is disclosed. The fingerprint sensing device includes: at least one sensing core, having a working power terminal and a working ground terminal, for fetching fingerprint images, wherein the at least one sensing core comprises a plurality of capacitive sensing units; a system unit, having a system power terminal which is connected to a power supply and a system ground terminal which is connected to ground; at least one switching unit, connected between the sensing core and the system unit; and a charge holding unit, electrically connected between the working power terminal and the working ground terminal, for providing power to the sensing core while power is not provided to the sensing core by the system unit.

The switching unit includes: a power switch, connected between the working power terminal and the system power terminal; a ground switch, connected between the working ground terminal and the system ground terminal; a drive-up switch, connected between the working ground terminal and the system power terminal; and a drive-down switch, connected between the working power terminal and the system ground terminal.

The switching unit switches between the following four operation states: a normal state, the power switch and the ground switch are both turned on and the rest of the switches are turned off, to provide power from the system unit to the sensing core; an isolation state, all of the switches in the switching unit are turned off and power is provided to the sensing core by the charge holding unit to prevent glitches from occurring; a drive-up state, the drive-up switch is turned on and the rest of the switches are turned off, to lift-up the voltage of the sensing core by a voltage level being equal to the voltage difference between the system power terminal and the system ground terminal; and a drive-down state, the drive-down switch is turned on and the rest of the switches are turned off, to drive-down the voltage of the sensing core by the voltage level being equal to the voltage difference between the system power terminal and the system ground terminal.

Preferably, the fingerprint sensing device further includes a timing control circuit, connected to the switching unit, for controlling time sequence of the switches in the switching unit.

Preferably, the fingerprint sensing device further includes an input/output (I/O) circuit, connected between the sensing core and an external device, for providing an interface between the fingerprint sensing device and the external device.

Preferably, the sensing core further includes a processing circuit which has an analog-to-digital converter, electrically connected to the plurality of capacitive sensing units, for converting output voltages of the plurality of capacitive sensing units into data to be provided to the external device.

Preferably, the processing circuit further includes a differential amplifier and a sample and hold circuit which is multiplexed to or electrically connected to the differential amplifier which is multiplexed to or electrically connected to the analog-to-digital converter.

Preferably, the sensing core further includes a data transfer unit, electrically connected between the analog-to-digital converter and the I/O circuit, for temporarily storing data from the analog-to-digital converter and transferring the stored data to the I/O circuit according to a data transfer command received from the timing control circuit during the normal state after the data transfer unit and the I/O circuit reach the same ground voltage.

Preferably, the sensing core further includes a protection circuit, electrically connected between the data transfer unit and the I/O circuit to ensure that the voltage level of the stored data remains within a valid or acceptable range of the I/O circuit while the stored date is transferred to the I/O circuit and to ensure that the voltage level of an input signal remains within a valid or acceptable range of the data transfer unit while the input signal is sent from the I/O circuit to the data transfer unit.

Preferably, the fingerprint sensing device further includes a conducting unit, electrically connected to the system ground terminal, for keeping electric potential of a finger directly or indirectly contacted thereto the same as that of the system ground terminal.

Preferably, the output voltages of the plurality of capacitive sensing units are measured during a sensing period in either the drive-up state or the drive-down state which starts after a time delay and ends at a predetermined time before switching from the drive-up state to the isolation state or switching from the drive-down state to the isolation state in response to a voltage shift generated between the finger and the sensing core.

Preferably, the voltage shift is a negative voltage shift generated by controlling the switching unit to perform different operation states in an order of: the normal state; the isolation state; the drive-up state; the isolation state; and the normal state.

Preferably, the voltage shift is a positive voltage shift generated by controlling the switching unit to perform different operation states in an order of: the normal state; the isolation state; the drive-down state; the isolation state; and the normal state.

Preferably, the voltage shift comprises a negative voltage shift and a positive voltage shift generated by controlling the switching unit to perform different operation states in an order of: the normal state; the isolation state; the drive-up state; the isolation state; the drive-down state; the isolation state; and the normal state, or in an order of: the normal state; the isolation state; the drive-down state; the isolation state; the drive-up state; the isolation state; and the normal state.

Preferably, a voltage difference between the measured output voltages during the drive-up state and the drive-down state are converted into the data provided to the data transfer unit.

Preferably, each of the plurality of capacitive sensing units comprises a reset unit, for resetting a base voltage of the capacitive sensing unit to a current voltage of the capacitive sensing unit.

Preferably, the base voltage of the capacitive sensing unit is reset after data is provided to the data transfer unit.

Preferably, the base voltage of the capacitive sensing unit is reset at the predetermined time before switching from the drive-up state to the isolation state or switching from the drive-down state to the isolation state, and the output voltages of the plurality of capacitive sensing units are measured again during the normal state which starts after the time delay and ends at the predetermined time before the output voltages are converted into the data and provided to the data transfer unit.

Preferably, the charge holding unit is a capacitor, an inductor, a battery, a constant power source, or a combination of them.

Preferably, each of the plurality of capacitive sensing units comprises a power node connected to the working power terminal and a ground node connected to the working ground terminal.

The present invention also discloses a method for operating the fingerprint sensing device which includes the steps of: generating a voltage shift between a finger and the sensing core; measuring output voltages of the capacitive sensing units in response to the voltage shift in either the drive-up state or the drive-down state during a sensing period which starts after a time delay and ends at a predetermined time before switching from the drive-up state to the isolation state or switching from the drive-down state to the isolation state; converting the measured output voltages into data; storing the data in a data transfer unit; and transferring the stored data to an I/O circuit from the data transfer unit during the normal state after the data transfer unit and the I/O circuit reach the same ground voltage.

Preferably, the voltage shift is a negative voltage shift generated by controlling the switching unit to perform different operation states in an order of: the normal state; the isolation state; the drive-up state; the isolation state; and the normal state.

Preferably, the voltage shift is a positive voltage shift generated by controlling the switching unit to perform different operation states in an order of: the normal state; the isolation state; the drive-down state; the isolation state; and the normal state.

Preferably, the voltage shift comprises a negative voltage shift and a positive voltage shift generated by controlling the switching unit to perform different operation states in an order of: the normal state; the isolation state; the drive-up state; the isolation state; the drive-down state; the isolation state; and the normal state, or in an order of: the normal state; the isolation state; the drive-down state; the isolation state; the drive-up state; the isolation state; and the normal state.

Preferably, the method further includes the steps of: calculating a voltage difference between the measured output voltages during the drive-up state and the drive-down state; and converting the voltage difference into the data.

Preferably, the method further includes the steps of: resetting a base voltage of the capacitive sensing unit to a current voltage of the capacitive sensing unit after the output voltages of the capacitive sensing units are measured in response to the voltage shift during either the drive-up state or the drive-down state; and measuring the output voltages of the capacitive sensing units during the normal stage after the base voltage is reset.

BRIEF DESCRIPTION OF THE DRAWINGS

FIG. 4 is a table illustrating the status of switches of a switching unit in different operation states according to the present invention.

FIG. 5a is a schematic diagram of a protection circuit for the data being transferred from an I/O circuit to a sensing core according to the present invention; and FIG. 5b is a schematic diagram of a protection circuit for the data being transferred from the sensing core to the I/O circuit according to the present invention.

FIG. 11a is a perspective view of a physical structure of two isolated wells of a NMOS transistor; and FIG. 11b is a side view of the isolated wells of the NMOS transistor in FIG. 11a.

DETAILED DESCRIPTION OF THE PREFERRED EMBODIMENTS

The present invention will now be described more specifically with reference to the following embodiments.

Figure 1:
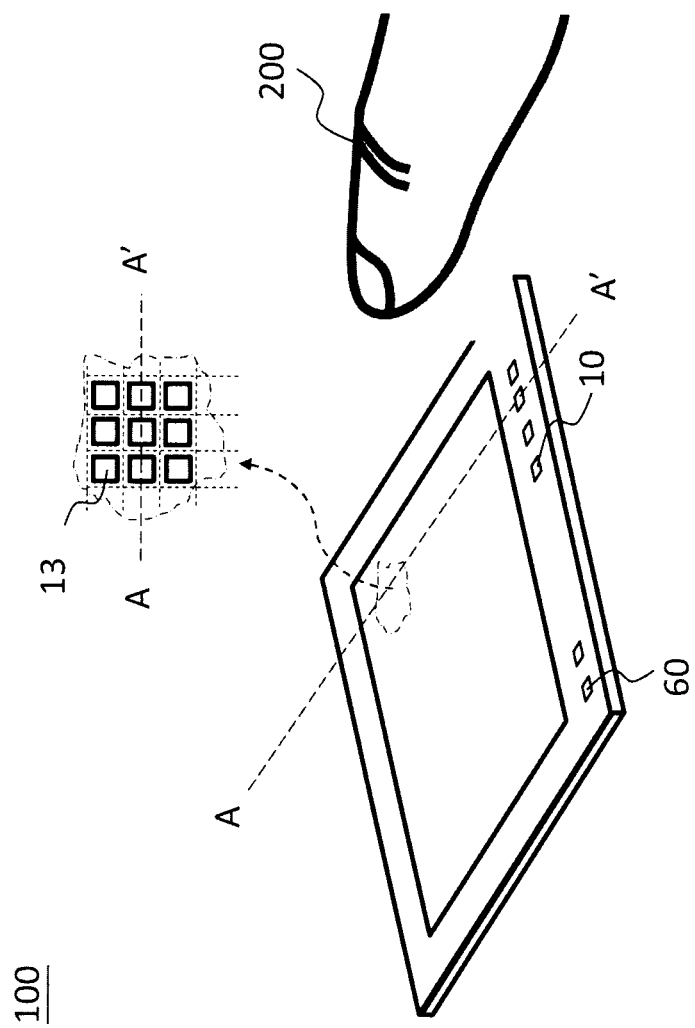
FIG. 1 is a schematic diagram of a fingerprint sensing device according to the present invention.
Figure 2:
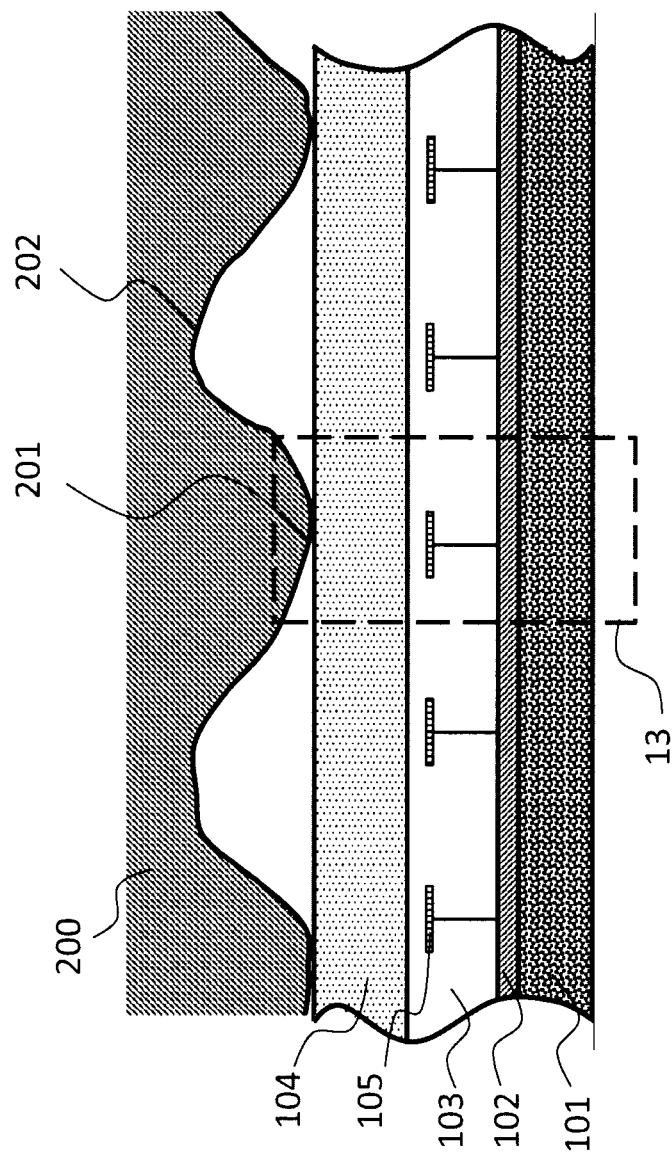
FIG. 2 is a schematic cross-section of a portion of the fingerprint sensing device taken along line A-A' in FIG. 1.

Please refer to FIGS. 1 and 2. FIG. 1 is a schematic diagram of a fingerprint sensing device 100 according to the present invention, and FIG. 2 is a schematic cross-section of a portion of the fingerprint sensing device 100 taken along line A-A' in FIG. 1. The fingerprint sensing device 100 includes an array of capacitive sensing units 13, the capacitive sensing units 13 are used to measure the capacitance between a surface of a finger 200 and the capacitive sensing units 13. The higher the capacitance, the nearer the surface of the adjacent or overlying finger 200 to the capacitive sensing unit 13. Thus, ridges 201 of the finger 200 provide a higher capacitance in the underlying capacitive sensing unit 13 than do valleys 202 of the finger 200.

As shown in FIG. 2, the fingerprint sensing device 100 includes a semiconductor substrate 101; active semiconductor circuitries 102 formed on the semiconductor substrate 101; an insulating layer 103 formed on the active semiconductor circuitries 102; and a protective layer 104 placed above the insulating layer 103 to provide protection to the capacitive sensing units 13 while the finger 200 touches the fingerprint sensing device 100. The sensing electrodes 105 are enclosed in the insulating layer 103 and are each electrically connected to the active semiconductor circuitries 102. The protective layer 104 may be made of glass, sapphire, epoxy compound, or coating material. The surface of the finger 200 includes ridges 201 that are in contact with the protective layer 104 and valleys 202 that are spaced apart from the protective layer 104. The capacitive sensing units 13 are used to convert a distance between a portion of a surface of the overlying finger 200 and a top surface of itself into an output electric potential. Five capacitive sensing units 13 are shown in FIG. 2, each enclosed by a dashed frame. Each capacitive sensing units 13 includes a sensing electrode 105 in the form of a conductive plate.

Figure 3:
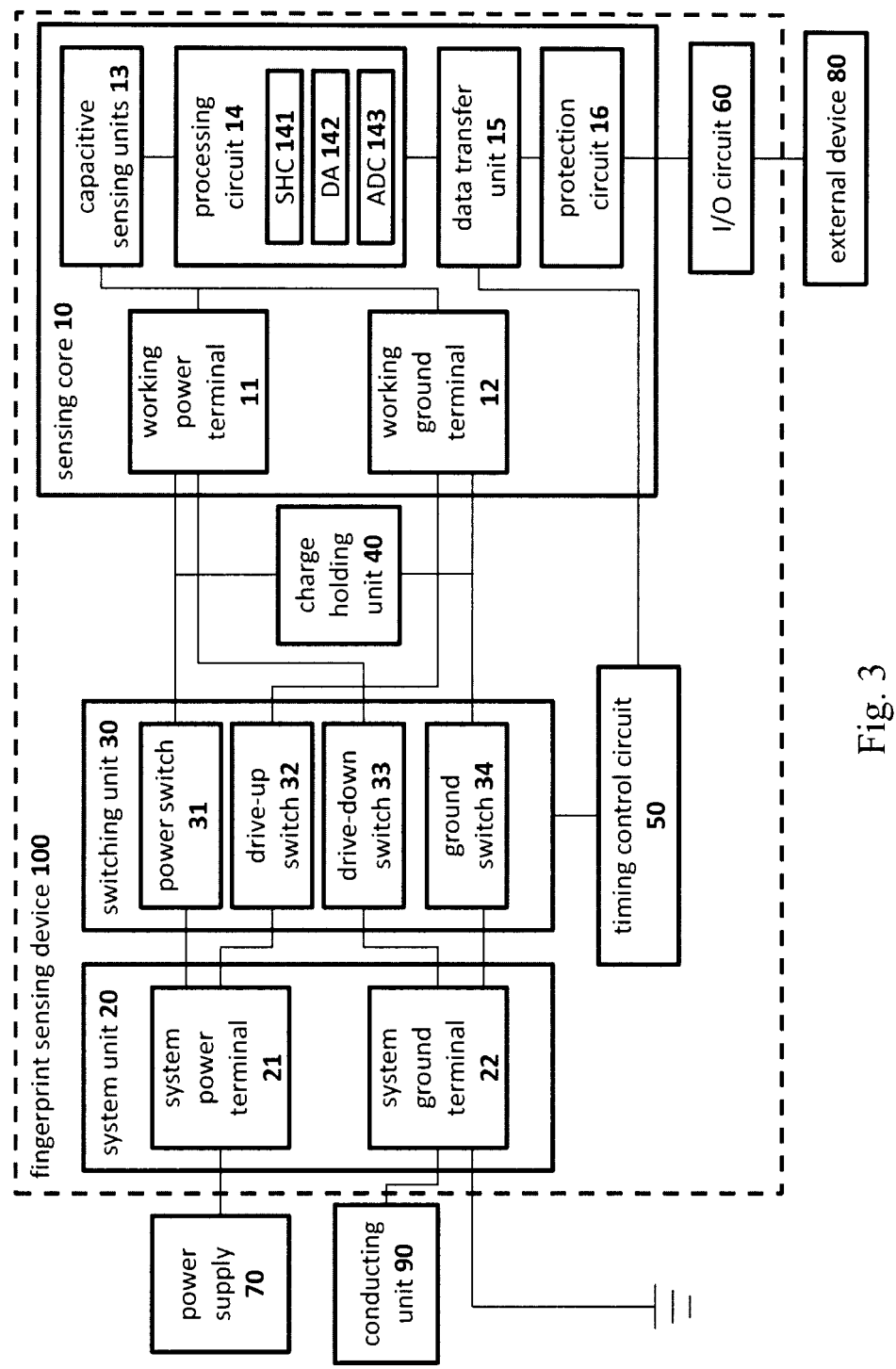
FIG. 3 is a block diagram of a fingerprint sensing device according to the present invention.

Please refer to FIG. 3 which is a block diagram of a fingerprint sensing device 100 according to the present invention. The fingerprint sensing device 100 mainly includes at least one sensing core 10 for fetching fingerprint images; a system unit 20; at least one switching unit 30, connected between the sensing core 10 and the system unit 20; and a charge holding unit 40. Although only one sensing core 10 and switching unit 30 are illustrated in FIG. 3 for purposes of clarity and simplicity, it should be understood that the amount of sensing core 10 and switching unit 30 are not limited to be one. Multiple sensing cores 10 and switching units 30 may be included. According to the present embodiment, the amount of the switching units 30 included in the fingerprint sensing device 100 is the same as the sensing cores 10 included in the fingerprint sensing device 100. Meaning that, each sensing core 10 has a corresponding switching unit 30 connected thereto.

The fingerprint sensing device 100 has an array of individual capacitive sensing units 13. The array of individual capacitive sensing units 13 may be one-dimensional or two-dimensional. In this embodiment, it is a two-dimensional array arranged in rows and columns. The amount of sensing core 10 depends on the amount of capacitive sensing units 13 connected to or included in a single sensing core 10. If the capacitive sensing units 13 are all connected to or included in the same sensing core 10, then only one sensing core 10 is needed to be included in the fingerprint sensing device 100, whereas if each are separately connected to or included in a sensing core 10, then the amount of sensing cores 10 required is the same as that of the capacitive sensing units 13. In the present embodiment, every row of capacitive sensing units 13 are connected to or included in one sensing core 10, i.e., if there are two-hundred rows of capacitive sensing units 13 in the array, then there will be two-hundred sensing cores 10 included in the fingerprint sensing device 100. Alternatively, the capacitive sensing units 13 can be separately connected to or included in the sensing cores 10 by columns, i.e., if there are sixty columns of capacitive sensing units 13 in the array, then there will be sixty sensing cores 10 included in the fingerprint sensing device 100.

Each sensing core 10 has a working power terminal 11 and a working ground terminal 12, and each of the capacitive sensing units 13 has a power node connected to the working power terminal 11 and a ground node connected to the working ground terminal 12.

The system unit 20 has a system power terminal 21 which is connected to a power supply 70 and a system ground terminal 22 which is connected to ground, as shown in FIG. 3.

Each of the switching unit 30 includes: a power switch 31, connected between the working power terminal 11 and the system power terminal 21; a ground switch 34, connected between the working ground terminal 12 and the system ground terminal 22; a drive-up switch 32, connected between the working ground terminal 12 and the system power terminal 21; and a drive-down switch 33, connected between the working power terminal 11 and the system ground terminal 22. The switches in the switching unit 30 may be metal oxide semiconductor field effect transistor (MOSFET) switches.

Please refer to FIG. 4, the switching unit 30 switches between the following four operation states: a normal state, the power switch 31 and the ground switch 34 are both turned on and the rest of the switches are turned off, to provide power from the system unit 20 to the sensing core 10; an isolation state, all of the switches in the switching unit 30 are turned off and power is provided to the sensing core 10 by the charge holding unit 40 to prevent glitches from occurring; a drive-up state, the drive-up switch 32 is turned on and the rest of the switches are turned off, to lift-up the voltage of the sensing core 10 by a voltage level being equal to the voltage difference between the system power terminal 21 and the system ground terminal 22; and a drive-down state, the drive-down switch 33 is turned on and the rest of the switches are turned off, to drive-down the voltage of the sensing core 10 by the voltage level being equal to the voltage difference between the system power terminal 21 and the system ground terminal 22. The voltage of the sensing core 10 actually refers to the ground voltage level and the bias voltage of all components included in the sensing core 10. In other words, the voltage of all components shifts with the voltage at the working ground terminal 12 while in drive-up or drive-down state.

The charge holding unit 40 is electrically connected between the working power terminal 11 and the working ground terminal 12, for providing power to the sensing core 10 while power is not provided to the sensing core 10 by the system unit 20. The charge holding unit 40 can be a capacitor, an inductor, a battery, a constant power source, or even a combination of the aforementioned.

The fingerprint sensing device 100 may also include a timing control circuit 50, connected to the switching unit 30, for controlling time sequence of the switches in the switching unit 30; and an input/output (I/O) circuit 60, connected between the sensing core 10 and an external device 80, for providing interface between the fingerprint sensing device 100 and the external device 80.

In each of the sensing core 10 has a data transfer unit 15 and a processing circuit 14 which has an analog-to-digital converter (ADC) 143 included therein. The plurality of capacitive sensing units 13 in the sensing core 10 are multiplexed to or electrically connected to the analog-to-digital converter 143 which is in charge of converting output voltages of the plurality of capacitive sensing units 13 into data to be provided to the external device 80. The data transfer unit 15 is electrically connected between the processing circuit 14 and the I/O circuit 60, for temporarily storing data converted by the analog-to-digital converter 143 and transferring the stored data to the I/O circuit 60 according to a data transfer command received from the timing control circuit 50 during the normal state after the data transfer unit 15 and the I/O circuit 60 reach the same ground voltage.

In certain embodiments, the processing circuit 14 may further include a sample and hold circuit (SHC) 141 and a differential amplifier (DA) 142 which is electrically connected to the SHC 141. In this case, the plurality of capacitive sensing units 13 in the sensing core 10 are instead multiplexed to or electrically connected to the SHC 141. The SHC 141 may be multiplexed to or electrically connected to the DA 142, and the DA 142 may be multiplexed to or electrically connected to the analog-to-digital converter 143.

The SHC 141 samples (i.e., captures) the output voltages of the plurality of capacitive sensing units 13 of different states (i.e., drive-up state and drive-down state) and holds (i.e., locks, freezes, retains) its value at a constant level for a specified period of time so that the DA 142 can further calculate the voltage difference between the sampled output voltages during the drive-up state and the drive-down state. The calculated voltage difference is then amplified and sent to the analog-to-digital converter 143 by the DA 142 to be digitized. For cases without the SHC 141 and DA 142, the plurality of capacitive sensing units 13 in the sensing core 10 are multiplexed to or electrically connected to the analog-to-digital converter 143.

The fingerprint sensing device 100 may also include a conducting unit 90, electrically connected to the system ground terminal 22, for keeping electric potential of the finger 200 directly or indirectly contacted thereto the same as that of the system ground terminal 22. However, the conducting unit 90 is not limited to be included in the fingerprint sensing device 100, it can be separately placed out of the fingerprint sensing device 100 and be electrically connected thereto.

As previously mentioned, there is an analog-to-digital converter 143 in each of the sensing core 10 which is electrically connected to the capacitive sensing units 13 included in the sensing core 10, for converting output voltages of the capacitive sensing units 13 into data which is afterward used for depicting an image of a fingerprint. In the present embodiment, the output voltages of the capacitive sensing units 13 are measured during a sensing period in either the drive-up state or the drive-down state, so these two states are referred to as "sensing period" for sensing the capacitance between the capacitive sensing units 13 and fingerprint ridges/valleys of an adjacent or overlying finger 200, thereby determining whether fingerprint ridges or fingerprint valleys are placed above the capacitive sensing units 13 according to the capacitance. The higher the capacitance, the nearer the surface of the finger 200 to the capacitive sensing units 13. Thus, fingerprint ridges are determined while a higher capacitance is obtained and fingerprint valleys are determined while a lower capacitance is obtained.

Mainly, the drive-up state and the drive-down state are sandwiched between two isolation states while switching from or switching to the normal state. During the isolation state, all of the switches in the switching unit 30 are turned off, and thus power can't be provided from the system unit 20 to the sensing core 10. In this case, power is instead provided by the charge holding unit 40 so that voltage of the sensing core 10 can remain as it is before being driven-up or driven-down. Please note that power is also provided to the sensing core 10 by the charge holding unit 40 during the drive-up state and the drive-down state since the power switch 31 is turned on only during the normal state, as shown in FIG. 4.

In order to increase the accuracy of the measured output voltages of the capacitive sensing units 13, the measurement of the output voltages only occurs while the voltage of the sensing core 10 is stable (i.e., the capacitive sensing units 13 reach an electrically stationary phase). Hence, the measurement will not be performed at a beginning period and an end period of the drive-up state and the drive-down state. In other words, fingerprint sensing/capturing by measuring output voltages of the capacitive sensing units 13 is performed only during a sensing period which starts after a time delay (i.e., the beginning period) and ends at a predetermined time (i.e., the end period) before switching from the drive-up state to the isolation state or switching from the drive-down state to the isolation state in response to a voltage shift generated between the finger 200 and the sensing core 10 caused by the drive-up state or the drive-down state. Please note that the measurement of the output voltages of the capacitive sensing units 13 does not require to occupy the complete sensing period and can be "anytime" during the sensing period. For example, if the sensing period is 0.1 microsecond and the measurement only needs a few nanoseconds, then the measurement can take place anytime between that 0.1 microseconds. Meaning that, the measurement might take place 10 nanoseconds after the sensing period begins.

The time delay and the predetermined time are set by the timing control circuit 50 which controls when to start and end the "sensing period" and a "data transfer period" by sending a "transfer start signal" and a "transfer stop signal" to the switching unit 30 or the sensing core 10. The time delay and the predetermined time can also be preset by the sensing core 10. The time delay and the predetermined time are not limited to be the same.

Furthermore, in order to ensure voltage is stable while data is being transferred to the I/O circuit 60 from the data transfer unit 15 during the normal state, as that of the sensing period, the data transfer period does not begin at the very beginning of the normal state but starts after a time delay and ends at a predetermined time before switching from the normal state to the isolation state. Data transfer can be performed "anytime" during the data transfer period.

During the sensing period, the ground voltage of the sensing core 10 will be shifted up and/or down with respect to the system ground level at the system ground terminal 22. During this period, data transfer becomes unreliable due to the fact that I/O signal reference level has a voltage mismatch between the sensing core 10 and other elements in the fingerprint sensing device 100. In order to overcome such problem, a sophisticated level-shifting circuitry such as optical coupling element can be employed or a handshaking mechanism between the sensing core 10 and the I/O circuit 60 can be implemented to stop data exchange for a short period, thereby avoiding unreliable data transfer. Mainly, the handshaking mechanism works by two ways. One way is to send a signal indicating whether data transfer is ready to be performed in advanced from the sensing core 10 to the I/O circuit 60 before data is actually being sent. Another way is to have the sensing core 10 wait for the permission of the I/O circuit 60 before starting the sensing period. Meaning that, an activation command is required every time the sensing period is to be performed, and a time period between each data transfer is needed. Hence, the time delay and the predetermined time during each "sensing period" and "data transfer period" are necessary.

Furthermore, as aforementioned, the stored data is transferred to the I/O circuit 60 by the data transfer unit 15 according to the data transfer command received from the timing control circuit 50 during the normal state after the data transfer unit 15 and the I/O circuit 60 reach the same ground voltage. An additional precaution that is resilient to timing failure may be needed to improve fault-tolerance of the devices. When timing failure happens, the stored data is transferred without waiting for the data transfer unit 15 and the I/O circuit 60 to reach the same ground voltage which may be caused by systematic error, malfunction of the timing control circuit 50 or the data transfer unit 15 or even external conditions such as electrostatic discharge from the environment. In such case, the voltage level at the I/O circuit 60 might exceed its valid or acceptable range which will lead to a permanent damage to the I/O circuit 60 and/or the data transfer unit 15 while the ground level of the sensing core 10 is shifted and data is transferred without waiting for the data transfer unit 15 and the I/O circuit 60 to reach the same ground voltage. To address this problem, the sensing core 10 may further include a protection circuit 16 electrically connected between the data transfer unit 15 and the I/O circuit 60 to ensure that the voltage level of the signal transmitted between the data transfer unit 15 and the I/O circuit 60 remains within the valid or acceptable range of the signal receiving device (i.e., the data transfer unit 15 or the I/O circuit 60) while timing failure occurs. In other words, the protection circuit 16 adjusts the voltage level of the input signal to a voltage level that is within the valid or acceptable range of either the data transfer unit 15 or the I/O circuit 60 depending on which is the signal receiving device before outputting the signal so that the voltage level of the signal inputted into the data transfer unit 15 or the I/O circuit 60 will not exceed the valid or acceptable range of the data transfer unit 15 or the I/O circuit 60 at any time or any condition, thereby preventing circuit damage to the data transfer unit 15 or the I/O circuit 60.

The protection circuit 16 may simply be formed by a couple of logic gates, as shown in FIG. 5a and FIG. 5b. FIG. 5a is a schematic diagram of the protection circuit 16 for the data line transferring data from the I/O circuit 60 to the sensing core 10 (the data transfer unit 15); and FIG. 5b is a schematic diagram of the protection circuit 16 for the data line transferring data from the sensing core 10 to the I/O circuit 60. Since only voltage level of the sensing core 10 shifts up and/or down and other elements in the fingerprint sensing device 100 ideally remain the same as the system unit 20 (i.e., the system power terminal 21 and the system ground terminal 22), the terms "RISE" and "FALL" in FIG. 5a and FIG. 5b are binary signals indicating the voltage shift of the sensing core 10 with respect to the voltage level of the system unit 20 during the drive-up state and the drive-down state, respectively. More precisely, RISE is set to "1" while the voltage of the sensing core is raised to the range of 3~6V during the drive-up state and is set "0" otherwise, and FALL is set to "1" during the drive-down state and is set "0" otherwise. Please note that the schematic diagrams of the protection circuit 16 are merely an example and the present invention should not be limited thereto.

The aforementioned voltage shift generated between the finger 200 and the sensing core 10 during a fingerprint sensing cycle can be either positive or negative, or even include both positive and negative voltage shifts. A negative voltage shift is generated while voltage is driven-up during the fingerprint sensing process, and a positive voltage shift is generated while voltage is driven-down during the fingerprint sensing process.

For a better understanding of how the fingerprint sensing device 100 actually operates, please refer to FIGS. 6~10 which are schematic diagrams illustrating voltage change across time during a fingerprint sensing process of different embodiments. In FIGS. 6~10, the symbol VDD represents the electric potential of the working power terminal 11 and the symbol GND represents the electric potential of the working ground terminal 12.

Figure 6:
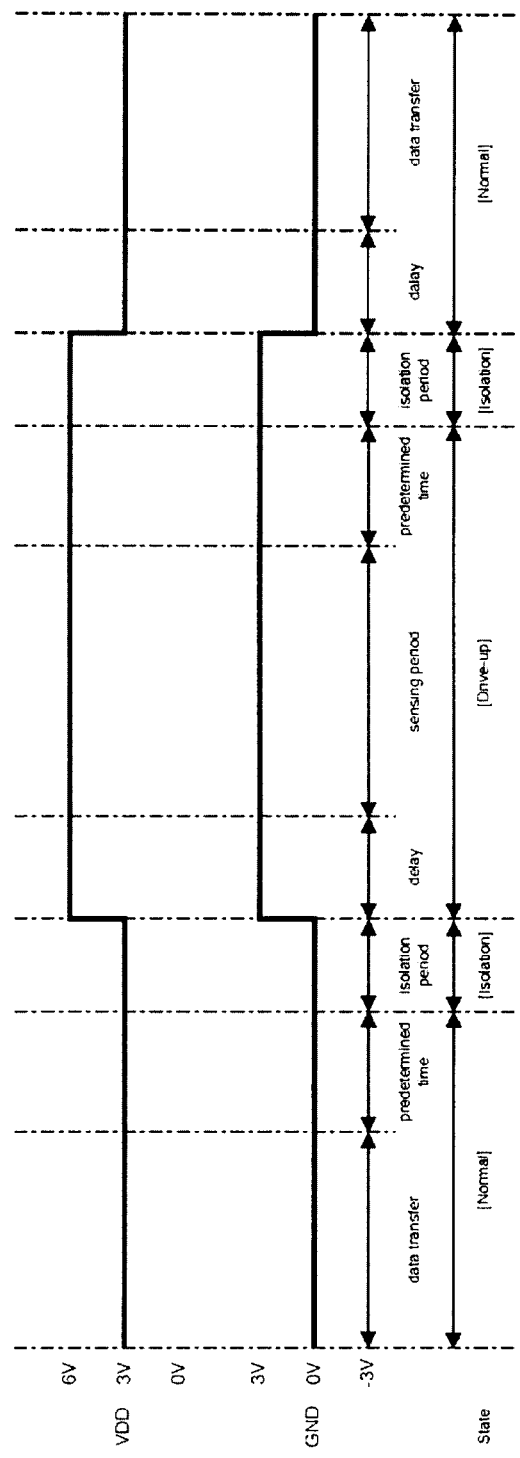
FIG. 6 is a schematic diagram illustrating voltage change across time during a fingerprint sensing process according to a first embodiment.

FIG. 6 is a schematic diagram illustrating voltage change across time during a fingerprint sensing process according to a first embodiment. In this embodiment, a negative voltage shift is generated while the switching unit 30 continues switching between different operation states in an order of: the normal state; the isolation state; the drive-up state; the isolation state; and the normal state.

Figure 7:
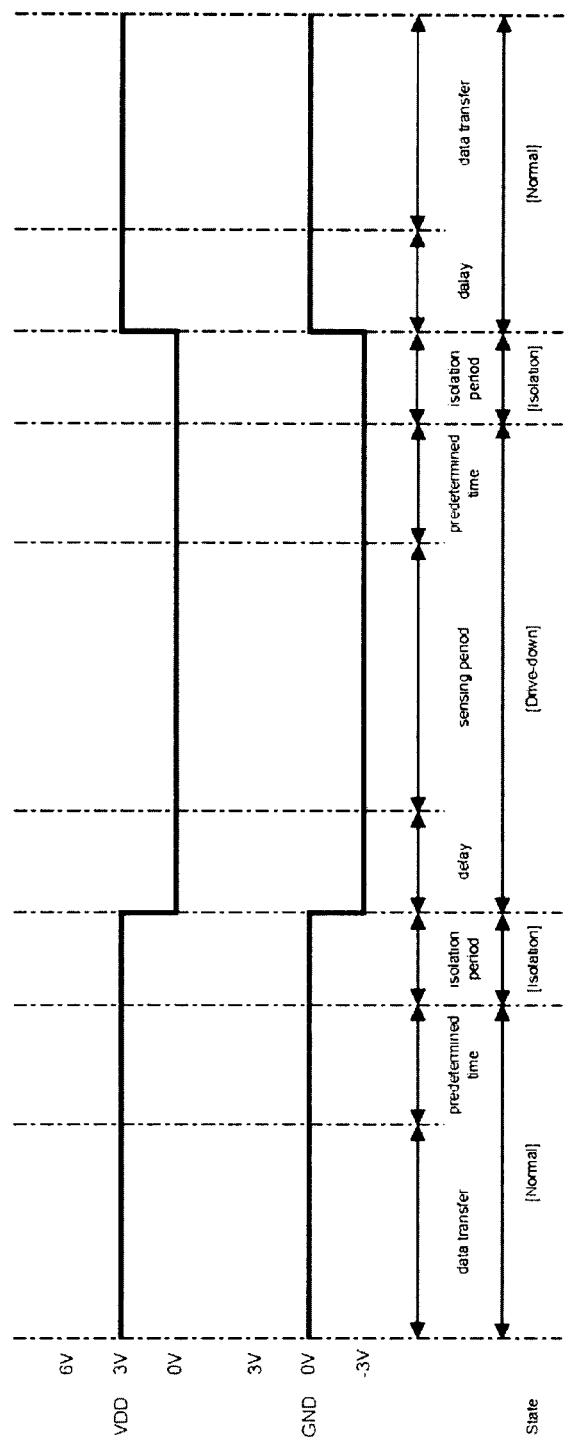
FIG. 7 is a schematic diagram illustrating voltage change across time during a fingerprint sensing process according to a second embodiment.

Alternatively, please refer to FIG. 7 which is a schematic diagram illustrating voltage change across time during a fingerprint sensing process according to a second embodiment. In this embodiment, a positive voltage shift is generated while the switching unit 30 continues switching between different operation states in an order of: the normal state; the isolation state; the drive-down state; the isolation state; and the normal state.

Specifically speaking, the fingerprint sensing device 100 is operated by the following steps: (1) a voltage shift is generated between a finger 200 and the sensing core 10; (2) output voltages of the capacitive sensing units 13 are measured in response to the voltage shift in either the drive-up state or the drive-down state during a sensing period which starts after the time delay and ends at the predetermined time before switching from the drive-up state to the isolation state or switching from the drive-down state to the isolation state; (3) the measured output voltages are converted into data by the analog-to-digital converter 143; (4) the data is stored in the data transfer unit 15; and (5) the stored data is transferred to the I/O circuit 60 from the data transfer unit 15 during the normal state after the data transfer unit 15 and the I/O circuit 60 reach the same ground voltage.

Figure 8:
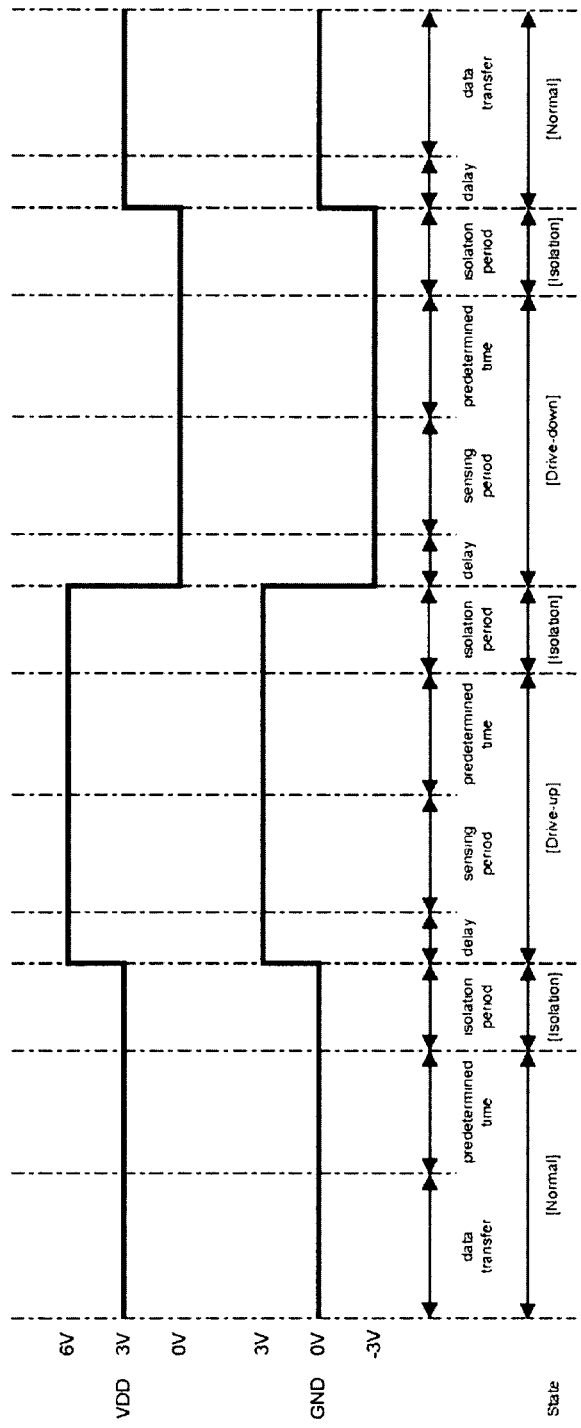
FIGS. 8 and 9 are schematic diagrams illustrating voltage change across time during a fingerprint sensing process according to a third embodiment.
Figure 9:
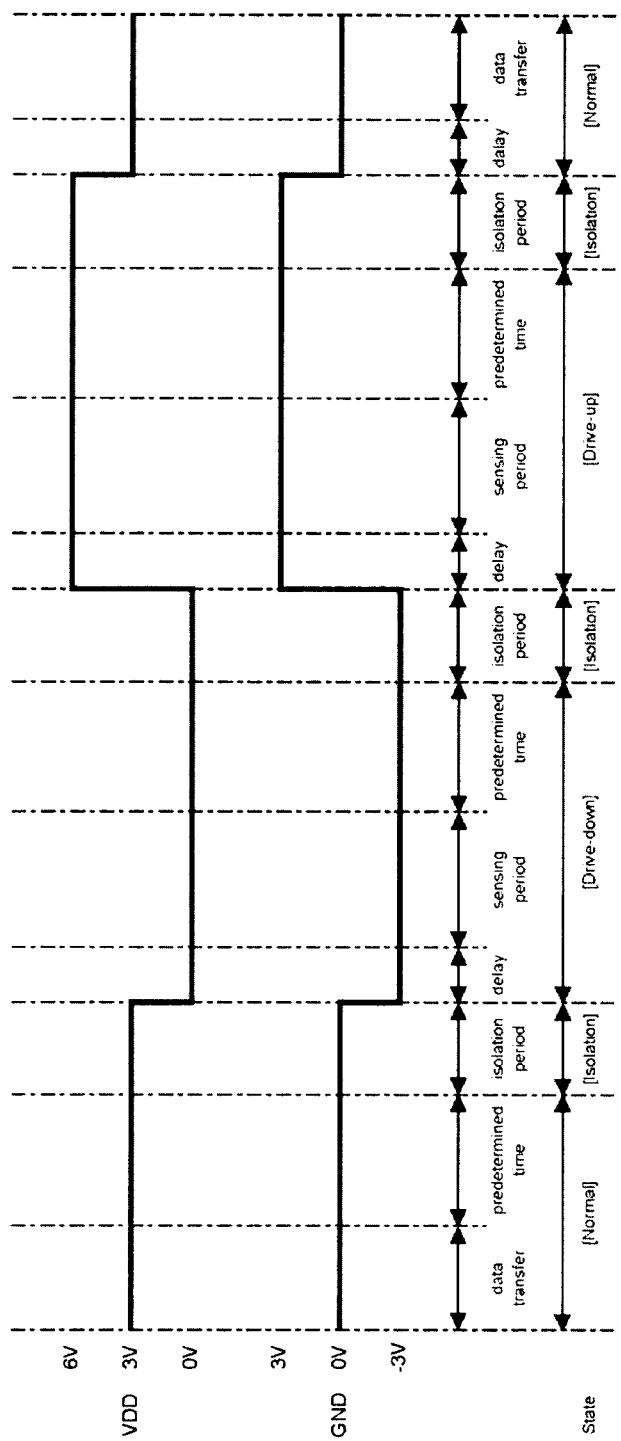

Next, please refer to FIGS. 8 and 9 which are schematic diagrams illustrating voltage change across time during a fingerprint sensing process according to a third embodiment. Different from the first and second embodiments generating either a positive voltage shift or a negative voltage shift during the fingerprint sensing process, the third embodiment generates both positive and negative voltage shifts during the fingerprint sensing process. In this embodiment, the switching unit 30 continues switching between different operation states in an order of: the normal state; the isolation state; the drive-up state; the isolation state; the drive-down state; the isolation state; and the normal state, as shown in FIG. 8. As an alternative, the switching unit 30 can also continue switching between different operation states in an order of: the normal state; the isolation state; the drive-down state; the isolation state; the drive-up state; the isolation state; and the normal state, as shown in FIG. 9.

While both positive and negative voltage shifts are generated during the fingerprint sensing process, a voltage difference between the measured output voltages during the drive-up state and the drive-down state are calculated and then converted into the data by the analog-to-digital converter 143 and afterwards provided to the data transfer unit 15. In the first and second embodiments, the SHC 141 and the DA 142 are not required to be included in the processing circuit 14 because the measured output voltage is directly sent to the analog-to-digital converter 143 to be digitized without any further calculations needed. However, in the third embodiment, both the SHC 141 and the DA 142 are required to be included in the processing circuit 14 so that the voltage difference between the measured output voltages during the drive-up state and the drive-down state can be calculated before being digitized.

In this embodiment, the fingerprint sensing device 100 is operated by the following steps: (1) a voltage shift is generated between a finger 200 and the sensing core 10; (2) output voltages of the capacitive sensing units 13 are measured in response to the voltage shift during the drive-up state and the drive-down state which starts after the time delay and ends at the predetermined time before switching from the drive-up state to the isolation state and switching from the drive-down state to the isolation state and hold by the SHC 141 in the processing circuit 14; (3) a voltage difference between the measured output voltages during the drive-up state and the drive-down state is calculated by the DA 142 and converted into the data by the analog-to-digital converter 143; (4) the data is stored in the data transfer unit 15; and (5) the stored data is transferred to the I/O circuit 60 from the data transfer unit 15 during the normal state after the data transfer unit 15 and the I/O circuit 60 reach the same ground voltage.

In this embodiment, the voltage difference between the measured output voltages during the drive-up state and the drive-down state are calculated by the fingerprint sensing device 100 before being sent to the external device 80.

However, the calculation is not necessary to be performed by the fingerprint sensing device 100, it can instead be performed by the external device 80. In such case, the SHC 141 and the DA 142 are not required to be included in the processing circuit 14, and the fingerprint sensing device 100 will be operated by the following steps: (1) a voltage shift is generated between a finger 200 and the sensing core 10; (2) a first output voltage of each of the capacitive sensing units 13 are measured in response to the voltage shift during the drive-up state which starts after the time delay and ends at the predetermined time before switching from the drive-up state to the isolation state by the analog-to-digital converter 143; (3) the measured first output voltage of each of the capacitive sensing units 13 are converted into a first data and sent to the data transfer unit 15 by the analog-to-digital converter 143; (4) a second output voltage of each of the capacitive sensing units 13 are measured in response to the voltage shift during the drive-down state which starts after the time delay and ends at the predetermined time before switching from the drive-down state to the isolation state by the analog-to-digital converter 143; (5) the measured second output voltage of each of the capacitive sensing units 13 are converted into a second data and sent to the data transfer unit 15 by the analog-to-digital converter 143; (6) the second data is stored in the data transfer unit 15; (7) the stored first and second data are transferred to the I/O circuit 60 from the data transfer unit 15 during the normal state after the data transfer unit 15 and the I/O circuit 60 reach the same ground voltage.

Hence, the necessity of the SHC 141 and the DA 142 in the processing circuit 14 is dependent upon whether the calculation of the voltage difference is to be performed by the fingerprint sensing device 100 or not.

Figure 10:
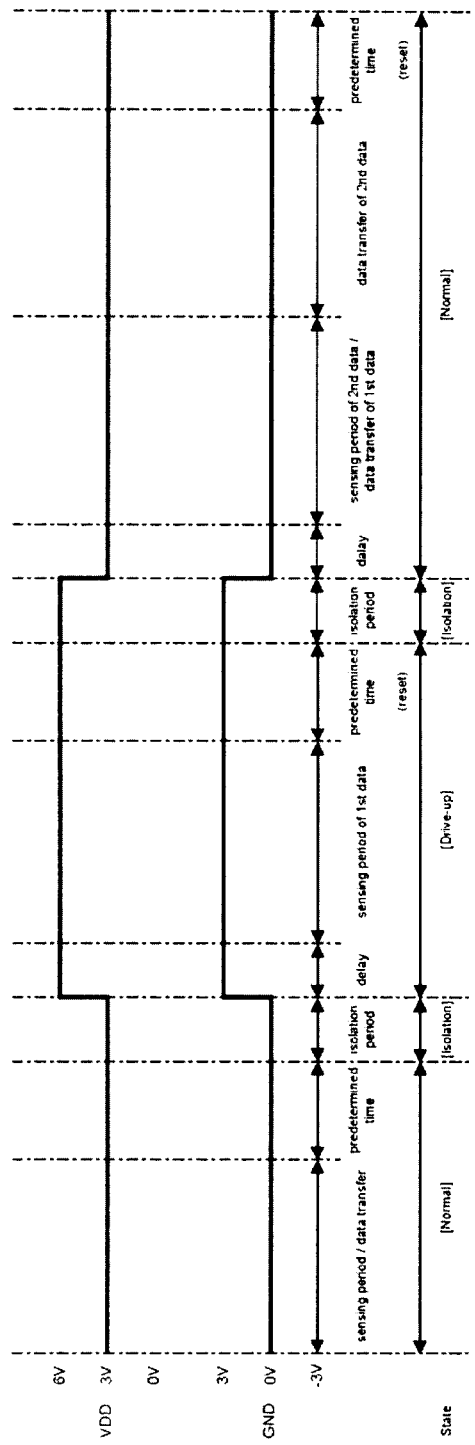
FIG. 10 is a schematic diagram illustrating voltage change across time during a fingerprint sensing process according to a fourth embodiment.

Please refer to FIG. 10 which is a schematic diagram illustrating voltage change across time during a fingerprint sensing process according to a fourth embodiment. Different from the aforementioned three embodiments having the "sensing period" set during the drive-up state and/or the drive-down state, the fourth embodiment not only has the "sensing period" set during the drive-up state and/or the drive-down state but also includes a "second sensing period" during the normal state after the first sensing period is performed during the drive-up state and/or the drive-down state.

As shown in FIG. 10, there are two sensing periods in a cycle of the fingerprint sensing process and data are separately obtained in the two sensing periods. In this embodiment, the two obtained data are not limited to be transferred to the I/O circuit 60 from the data transfer unit 15 at the same time during the normal state, they can be separately transferred. For example, the first data obtained during the first sensing period can be transferred first while the second data is in the second sensing period and then the second data is transferred after being obtained, as shown in FIG. 10. Or else, the first data obtained during the first sensing period can be transferred along with the second data after the second data is obtained.

Mainly, output voltages are measured and converted into data by the analog-to-digital converter 143 and stored in the data transfer unit 15. Then, the stored data is transferred to the I/O circuit 60 from the data transfer unit 15 during the normal state after the data transfer unit 15 and the I/O circuit 60 reach the same ground voltage. Meaning that, the first data can be transferred to the I/O circuit 60 from the data transfer unit 15 during the normal state whenever the data transfer unit 15 and the I/O circuit 60 reach the same ground voltage regardless of whether the second data is completely obtained or not.

According to the present invention, a reset unit (not shown) may be included in each of the capacitive sensing units 13 for resetting a base voltage of the capacitive sensing unit 13 to a current voltage of the sensing core 10. Usually, the base voltage of the capacitive sensing unit 13 is reset every time a cycle of the fingerprint sensing process is completed (i.e., after data is provided to the data transfer unit 15). The base voltage actually refers to the ground voltage level and the bias voltage of all components included in the capacitive sensing unit 13. For example, if a switch component inside the capacitive sensing unit 13 has a predetermined voltage at each node: 1.5V at drain node, 0V at source node, 0V for OFF and 1V for ON at gate node, and 0V at bulk node during the normal state, the voltage level of the switch component will be as follows with respect to the system ground voltage: 4.5V at drain node, 3V at source node, 3V for OFF and 4V for ON at gate node, 3V at bulk node during the drive-up state. In other words, the voltage at each node shifts with the voltage at the working ground terminal 12 while in drive-up or drive-down state.

In the fourth embodiment, the base voltage is not only reset after completion of each cycle, it is also reset at the predetermined time before switching from the drive-up state to the isolation state or switching from the drive-down state to the isolation state, and the output voltages of the capacitive sensing units 13 are measured again during the normal state which starts after the time delay and ends at the predetermined time before the output voltages are converted into the data and provided to the data transfer unit 15.

In other words, if the base voltage of the capacitive sensing unit 13 was originally 0V and was driven-up to 3V during the drive-up state, then the base voltage would be adjusted to 3V after being reset by the reset unit during the drive-up state, and thus the voltage change from 3V back to 0V in the normal state after being reset would be deemed as a voltage shift of −3V which would trigger a second sensing period to occur. In another example, if a component of the fingerprint sensing device 100 has a bias voltage that equals to a base voltage of ground voltage (0V at normal state) plus 1.5V, then it will first be driven-up by 3V and become 4.5V during the drive-up state, and then the base voltage of the component would be adjusted to 4.5V after being reset by the reset unit during the drive-up state, and thus the voltage change from 4.5V back to 1.5V in the normal state after being reset would be deemed as a voltage shift of −3V which would trigger a second sensing period to occur. In still another example, a component of the fingerprint sensing device 100 has a predetermined negative supply voltage 0V and a predetermined positive supply voltage 1.5V. When the sensing core 10 is driven-up from 0~3V to 3~6V during the drive-up state, the negative supply voltage of the component is set to 3V, and the positive supply voltage is set to 4.5V.

It should be noted that FIG. 10 is merely an example of incorporating the fourth embodiment with the first embodiment. According to the present invention, the fourth embodiment can also be incorporated with the second and third embodiments by the same way.

In the fourth embodiment, the fingerprint sensing device 100 is operated by the following steps: (1) a voltage shift is generated between a finger 200 and the sensing core 10; (2) output voltages of the capacitive sensing units 13 are measured in response to the voltage shift in either the drive-up state or the drive-down state during a sensing period which starts after the time delay and ends at the predetermined time before switching from the drive-up state to the isolation state or switching from the drive-down state to the isolation state; (3) the base voltage of the capacitive sensing unit 13 is reset to the current voltage of the capacitive sensing unit 13; (4) the measured output voltages are converted into a first data by the analog-to-digital converter 143; (5) the first data is stored in the data transfer unit 15; (6) the stored first data is transferred to the I/O circuit 60 from the data transfer unit 15 during the normal state after the data transfer unit 15 and the I/O circuit 60 reach the same ground voltage while the output voltages of the capacitive sensing units 13 are measured during the normal stage after the base voltage is reset; (7) the measured output voltages are converted into a second data by the analog-to-digital converter 143; (8) the second data is stored in the data transfer unit 15; and (9) the stored second data is transferred to the I/O circuit 60 from the data transfer unit 15 during the normal state.

As previously mentioned the first data obtained during the first sensing period could also be transferred along with the second data after the second data is obtained. In such case, the fingerprint sensing device 100 is operated by the following steps: (1) a voltage shift is generated between a finger 200 and the sensing core 10; (2) output voltages of the capacitive sensing units 13 are measured in response to the voltage shift in either the drive-up state or the drive-down state during a sensing period which starts after the time delay and ends at the predetermined time before switching from the drive-up state to the isolation state or switching from the drive-down state to the isolation state; (3) the base voltage of the capacitive sensing unit 13 is reset to the current voltage of the capacitive sensing unit 13; (4) the measured output voltages are converted into a first data by the analog-to-digital converter 143; (5) the first data is stored in the data transfer unit 15; (6) the output voltages of the capacitive sensing units 13 are measured during the normal stage after the base voltage is reset; (7) the measured output voltages are converted into a second data by the analog-to-digital converter 143; (8) the second data is stored in the data transfer unit 15; and (9) the stored first data and second data are transferred to the I/O circuit 60 from the data transfer unit 15 during the normal state after the data transfer unit 15 and the I/O circuit 60 reach the same ground voltage.

Alternatively, the SHC 141 may be included in the processing circuit 14 for either holding the first data for a specified period of time until the second data is ready to be transferred to the I/O circuit 60 or holding the measured output voltages measured during the two sensing period before the measured output voltages are sent to the analog-to-digital converter 143.

At certain stages during the operation, e.g. the drive-down state of the third embodiment, the voltage drop across the terminals of the switching unit 30 may exceed an allowable value which may cause permanent damage to the switch. As shown in FIG. 8, the ground switch may undergo a gate-to-source or gate-to-drain voltage drop of 6 volts during the drive-down state. In order to prevent damage to the switch by caused high voltage drop, there are several techniques that can be used to avoid gate-to-channel breakdown, such as controlling the slew rate of the voltage applied to the gate or simply use a thicker gate poly.

Normally, every element in a device refers to the same ground voltage of the device. However, as previously mentioned, ground voltage of the sensing core 10 of the present invention will be shifted up and/or down with respect to the system ground level during the sensing period which causes a voltage mismatch between the sensing core 10 and other elements in the fingerprint sensing device 100. All elements inside the sensing core 10 refer to the ground voltage of the sensing core 10. For a better understanding, below is an example to achieve a reference ground voltage of an element independent from the ground voltage of the device. Each of the two NMOS transistor uses an isolated well 180 to isolate the ground (bulk node) of the transistor from the other part of the device.

Please refer to FIGS. 11*a* and 11*b*. FIG. 11*a* is a perspective view of a physical structure of two isolated wells of the NMOS transistor, and FIG. 11*b* is a side view of the isolated wells of the NMOS transistor in FIG. 11*a*. The isolated well 180 includes an isolated P-type implant area (isolated P-well) 181, two heavily doped n-type regions that act as a source 182 and a drain 183, a gate node 184, an N-type implant area (N-well) 185, a layer of deep N-type implant area (DNW) 186, an isolated layer 187, a bulk contact (B-bulk) 188 to the bulk (the P-type implant area 181), and a thin isolator layer (gate oxide) 189. The source 182, the drain 183, the gate node 184, the bulk contact 188, and the thin isolator layer 189 are parts of the well-known structure of an ordinary NMOS transistor. However, to make the P-well isolated, other parts of the structure are needed. The isolated well 180 is a MOS implant structure to allow the bulk contact 188 of a transistor to be isolated and driven by a changing signal. For a P-type substrate wafer, the isolated well 180 for an NMOS transistor can be constructed as a P-type implant area (isolated P-well) 181 surrounded by a ring of N-well 185 and a layer of DNW 186 (deep N-well) from below, which are connected to a constant voltage (not shown) that is higher than the potential of the signal driving the isolated P-well 181. The bulk contact 188 is further connected to the well contact 150 for receiving the signal from driving source 160. In other words, the isolated well 180 is configured in such a way that a current can be prevented from flowing in/out from the interface between the P-type implant area 181 and the deep N-type implant area (DNW) 186, or from that between the P-type implant area 181 and the N-type implant area (N-well) 185. In another embodiment, the N-type implant area (N-well) 185 can be replaced by any method and materials, e.g. shallow trench isolation (STI) and/or deep trench isolation, that prevent current leakage at the interface between that area and the P-type implant area 181.

Although embodiments have been described herein with respect to particular configurations and sequences of operations, it should be understood that alternative embodiments may add, omit, or change elements, operations and the like. Accordingly, the embodiments disclosed herein are meant to be examples and not limitations.

What is claimed is:

1. A fingerprint sensing device, comprising:
   at least one sensing core, having a working power terminal and a working ground terminal, for fetching fingerprint images, wherein the at least one sensing core comprises a plurality of capacitive sensing units;
   a system unit, having a system power terminal which is connected to a power supply and a system ground terminal which is connected to ground;
   at least one switching unit, connected between the sensing core and the system unit, comprising:
      a power switch, connected between the working power terminal and the system power terminal;
      a ground switch, connected between the working ground terminal and the system ground terminal;
      a drive-up switch, connected between the working ground terminal and the system power terminal; and
      a drive-down switch, connected between the working power terminal and the system ground terminal; and
   a charge holding unit, electrically connected between the working power terminal and the working ground terminal, for providing power to the sensing core while power is not provided to the sensing core by the system unit,
   wherein the switching unit switches between the following four operation states:
      a normal state, the power switch and the ground switch are both turned on and the rest of the switches are turned off, to provide power from the system unit to the sensing core;
      an isolation state, all of the switches in the switching unit are turned off and power is provided to the sensing core by the charge holding unit to prevent glitches from occurring;
      a drive-up state, the drive-up switch is turned on and the rest of the switches are turned off, to lift-up the voltage of the sensing core by a voltage level being equal to the voltage difference between the system power terminal and the system ground terminal; and
      a drive-down state, the drive-down switch is turned on and the rest of the switches are turned off, to drive-down the voltage of the sensing core by the voltage level being equal to the voltage difference between the system power terminal and the system ground terminal.

2. The fingerprint sensing device according to claim 1, further comprising: a timing control circuit, connected to the switching unit, for controlling time sequence of the switches in the switching unit.

3. The fingerprint sensing device according to claim 2, further comprising: an input/output (I/O) circuit, connected between the sensing core and an external device, for providing an interface between the fingerprint sensing device and the external device.

4. The fingerprint sensing device according to claim 3, wherein the sensing core further comprises a processing circuit which has an analog-to-digital converter, electrically connected to the plurality of capacitive sensing units, for converting output voltages of the plurality of capacitive sensing units into data to be provided to the external device.

5. The fingerprint sensing device according to claim 4, wherein the processing circuit further comprises a differential amplifier and a sample and hold circuit which is multiplexed to or electrically connected to the differential amplifier which is multiplexed to or electrically connected to the analog-to-digital converter.

6. The fingerprint sensing device according to claim 4, wherein the sensing core further comprises a data transfer unit, electrically connected between the analog-to-digital converter and the I/O circuit, for temporarily storing data from the analog-to-digital converter and transferring the stored data to the I/O circuit according to a data transfer command received from the timing control circuit during the normal state after the data transfer unit and the I/O circuit reach the same ground voltage.

7. The fingerprint sensing device according to claim 6, wherein the sensing core further comprises a protection circuit, electrically connected between the data transfer unit and the I/O circuit to ensure that the voltage level of the stored data remains within a valid or acceptable range of the I/O circuit while the stored date is transferred to the I/O circuit and to ensure that the voltage level of an input signal remains within a valid or acceptable range of the data transfer unit while the input signal is sent from the I/O circuit to the data transfer unit.

8. The fingerprint sensing device according to claim 1, further comprising: a conducting unit, electrically connected to the system ground terminal, for keeping electric potential of a finger directly or indirectly contacted thereto the same as that of the system ground terminal.

9. The fingerprint sensing device according to claim 8, wherein the output voltages of the plurality of capacitive sensing units are measured during a sensing period in either the drive-up state or the drive-down state which starts after a time delay and ends at a predetermined time before switching from the drive-up state to the isolation state or switching from the drive-down state to the isolation state in response to a voltage shift generated between the finger and the sensing core.

10. The fingerprint sensing device according to claim 9, wherein the voltage shift is a negative voltage shift generated by controlling the switching unit to perform different operation states in an order of: the normal state; the isolation state; the drive-up state; the isolation state; and the normal state.

11. The fingerprint sensing device according to claim 9, wherein the voltage shift is a positive voltage shift generated by controlling the switching unit to perform different operation states in an order of: the normal state; the isolation state; the drive-down state; the isolation state; and the normal state.

12. The fingerprint sensing device according to claim 9, wherein the voltage shift comprises a negative voltage shift and a positive voltage shift generated by controlling the switching unit to perform different operation states in an order of: the normal state; the isolation state; the drive-up state; the isolation state; the drive-down state; the isolation state; and the normal state, or in an order of: the normal state; the isolation state; the drive-down state; the isolation state; the drive-up state; the isolation state; and the normal state.

13. The fingerprint sensing device according to claim 12, wherein a voltage difference between the measured output voltages during the drive-up state and the drive-down state is converted into the data provided to the data transfer unit.

14. The fingerprint sensing device according to claim 9, wherein each of the plurality of capacitive sensing units comprises a reset unit, for resetting a base voltage of the capacitive sensing unit to a current voltage of the capacitive sensing unit.

15. The fingerprint sensing device according to claim 14, wherein the base voltage of the capacitive sensing unit is reset after data is provided to the data transfer unit.

16. The fingerprint sensing device according to claim 15, wherein the base voltage of the capacitive sensing unit is reset at the predetermined time before switching from the drive-up state to the isolation state or switching from the drive-down state to the isolation state, and the output voltages of the plurality of capacitive sensing units are measured again during the normal state which starts after the time delay and ends at the predetermined time before the output voltages are converted into the data and provided to the data transfer unit.

17. The fingerprint sensing device according to claim 1, wherein the charge holding unit is a capacitor, an inductor, a battery, a constant power source, or a combination of them.

18. The fingerprint sensing device according to claim 1, wherein each of the plurality of capacitive sensing units comprises a power node connected to the working power terminal and a ground node connected to the working ground terminal.

19. A method for operating the fingerprint sensing device according to claim 1, comprising the steps of:
generating a voltage shift between a finger and the sensing core;
measuring output voltages of the capacitive sensing units in response to the voltage shift in either the drive-up state or the drive-down state during a sensing period which starts after a time delay and ends at a predetermined time before switching from the drive-up state to the isolation state or switching from the drive-down state to the isolation state;
converting the measured output voltages into data;
storing the data in a data transfer unit; and
transferring the stored data to an I/O circuit from the data transfer unit during the normal state after the data transfer unit and the I/O circuit reach the same ground voltage.

20. The method according to claim 19, wherein the voltage shift is a negative voltage shift generated by controlling the switching unit to perform different operation states in an order of: the normal state; the isolation state; the drive-up state; the isolation state; and the normal state.

21. The method according to claim 19, wherein the voltage shift is a positive voltage shift generated by controlling the switching unit to perform different operation states in an order of: the normal state; the isolation state; the drive-down state; the isolation state; and the normal state.

22. The method according to claim 19, wherein the voltage shift comprises a negative voltage shift and a positive voltage shift generated by controlling the switching unit to perform different operation states in an order of: the normal state; the isolation state; the drive-up state; the isolation state; the drive-down state; the isolation state; and the normal state, or in an order of: the normal state; the isolation state; the drive-down state; the isolation state; the drive-up state; the isolation state; and the normal state.

23. The method according to claim 22, further comprising the steps of: calculating a voltage difference between the measured output voltages during the drive-up state and the drive-down state; and converting the voltage difference into the data.

24. The method according to claim 19, further comprising the steps of: resetting a base voltage of the capacitive sensing unit to a current voltage of the capacitive sensing unit after the output voltages of the capacitive sensing units are measured in response to the voltage shift during either the drive-up state or the drive-down state; and measuring the output voltages of the capacitive sensing units during the normal stage after the base voltage is reset.

* * * * *